G. A. LYON.
AUTOMOBILE BUFFER.
APPLICATION FILED JAN. 5, 1920. RENEWED JAN. 20, 1922.
1,436,992.
Patented Nov. 28, 1922.
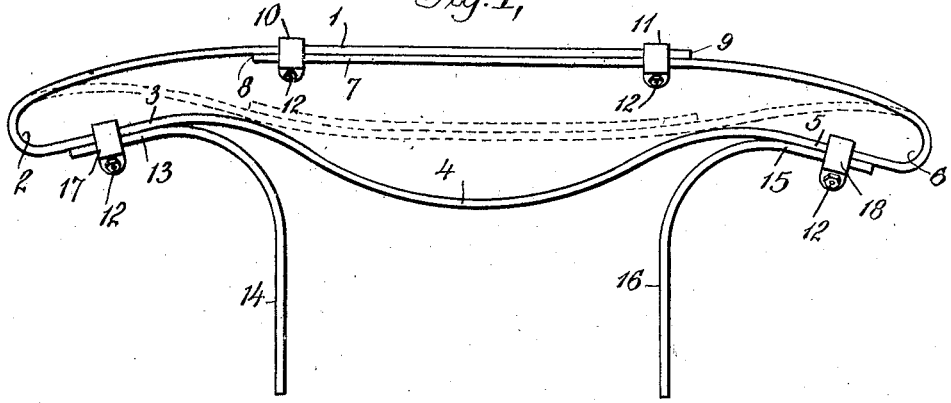
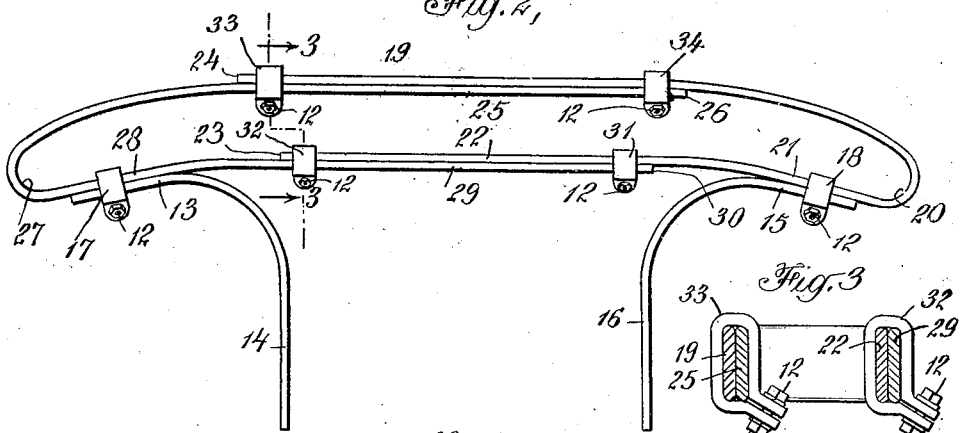
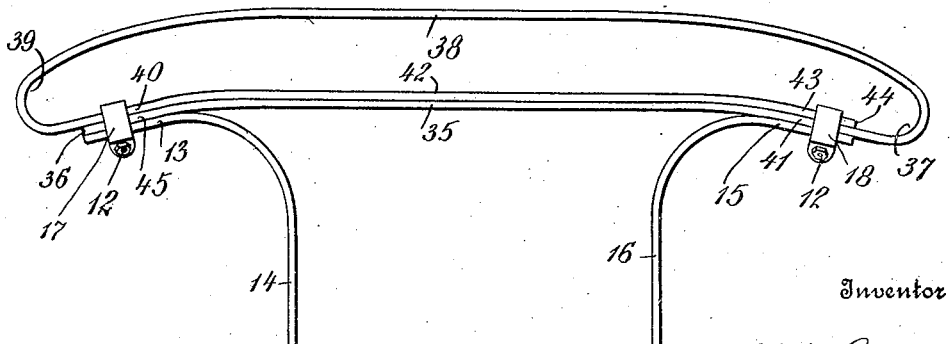
Inventor
George Albert Lyon
By Harry L. Duncan
Attorney Patented Nov. 28, 1922.

1,436,992

UNITED STATES PATENT OFFICE.

GEORGE ALBERT LYON, OF PHILADELPHIA, PENNSYLVANIA.

AUTOMOBILE BUFFER.

Application filed January 5, 1920, Serial No. 349,420. Renewed January 20, 1922. Serial No. 530,728.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Automobile Buffers, of which the following is a specification, taken in connection with the accompanying drawing.

This invention relates especially to resilient buffers or bumpers for automobiles or other vehicles in which the buffer comprises a duplex buffer front which may be formed of spring steel strip or other resilient material, so that the initial impact or forward member of the buffer front may be spaced a considerable distance away from the auxiliary rear member, the whole buffer front forming a looped end element which may be adjustably or otherwise connected to attaching members adapted to support it from the automobile frame or other convenient part of the vehicle. One or more spring steel strips may be used to form the duplex buffer front and overlapping reenforcing strips or portions may be used with advantage adjacent the central part of the forward or rear member of the duplex buffer front, but in some cases both these members may be formed with such overlapping reenforcing strips to give additional strength. Many of these types of duplex buffer fronts may be formed with a rearwardly bent or bowed rear member so as to give additional space between the two members adjacent the central portion of the duplex buffer front so that under impact or collision conditions a considerable degree of resilient yield of the forward member may take place so as to close the end loops before the central forward member is forced into engagement with the rear member of the buffer front to give still further increased resistance during the further resilient yield of the parts.

In the accompanying drawing which shows in a somewhat diagrammatic way a number of illustrative embodiments of this invention, Fig. 1 is a plan view showing an illustrative buffer.

Fig. 2 is a plan view showing another embodiment.

Fig. 3 is a corresponding transverse section thereof taken substantially along the line 3—3 of Fig. 2; and Fig. 4 is a plan view showing another illustrative arrangement.

The resilient duplex buffer front may be formed of one or more resilient strips of tempered spring steel, for example, which may be a quarter or three-eighths of an inch thick and two inches or so wide, and as indicated in Fig. 1 the buffer front may be formed of a single strip of spring steel bent to form the end loops 2 and 6 which are adapted to extend into protective position adjacent the wheels of the automobile or other vehicle while the ends of this spring strip may be carried inward so as to form overlapping reenforcing strips or portions 1, 7 throughout a considerable extent of the central part of this initial impact or forward member of the buffer front. If desired, the ends 8, 9 of this resilient strip may as indicated extend out somewhat beyond the attaching members 14, 16 of any suitable form which are adapted to be clamped or secured to the automobile frame so that throughout the distance between the automobile frame members this initial impact forward member of the buffer front may have such reenforced overlapping construction. These overlapping strips may be finished by grinding the front strip to or past the central part of the buffer front, and then throwing or springing this ground strip behind the other which can then be ground throughout its front face to give a smooth and finished appearance to the buffer front. These resilient strips may then be clamped or secured together in any suitable way and as indicated the enclosing clamping devices or clips 10, 11 may be employed for this purpose and secured together by bolts 12 which may be arranged in rearwardly inclined position at the lower portions of these clamping devices as shown in Fig. 3 of the dawing and described in connection with the Lyon Patent 1,198,246, of September 12, 1916. The duplex buffer front is preferably formed with connecting portions 3, 5 which may be substantially straight for some distance inside the end loops and the cooperating connecting portions such as 13 of the attaching members 14 may be clamped or secured thereto by similar clamping devices 17 when the bolt 12 is tightened, the corresponding connecting portion 15 of the other attaching member 16 being similarly clamped by the enclosing clip or clamping device 18 to the connecting portion 5 on the other side of the buffer front which may be straight or slightly curved, if desired.

It is sometimes advantageous to form duplex buffer front elements of this general character with end loops which are spaced fairly closely together so that they are not separated by more than three or four inches or so, while at the central portion of the duplex buffer front the forward and rear members may be separated by a considerably greater distance as by bending rearwardly the auxiliary rear member 4 adjacent its central portion so that six to ten inches or more separation may thus be secured between the forward and rear members at this part of the buffer front. Under collision conditions where the impact occurs adjacent the central part of the buffer front the forward initial impact member is bent as it resiliently resists the impact and especially where this forward member has such a doubled reenforced construction as indicated in Fig. 1 the end loops 2 and 6 tend to close so that after the central part of the forward member has been forced back these end loops are closed together sufficiently so that contact frequently occurs between the forward and rear members between the end loops and the central portion of the duplex buffer front somewhat as indicated by the dotted lines in Fig. 1. If the collision impact has not been absorbed the further yielding of the buffer front brings its forward member into engagement with the auxiliary rear member adjacent the center of the buffer so that a still greater degree of strength and resilient resistance is thus exerted rendering the device highly effective in the case of severe collision impacts and correspondingly protecting the radiator and other parts of the automobile from serious injury.

Fig. 2 shows another arrangement in which the duplex buffer front is shown as rendered of adjustable width by being formed of two generally similar looped elements which may be provided with overlapping reenforcing connecting portions which may be adjustably clamped or connected together so that the width of the buffer front may be adjusted to correspond with the ordinary range of width of automobiles and similar vehicles. One of these loop elements may comprise the end loop 20 and the connected strips 19, 21, 22 while the corresponding element may have the loop end 27 and the connected portions 25, 28 and 29. As indicated the ends of these loop elements 23, 24 and 26, 30 may be located in line with or somewhat outside of the connected attaching members 14, 16 of generally similar construction, so that overlapping reenforced portions may thus be formed in both the forward and rear members of the duplex buffer front to which attaching members, such as 14, 16, may be adjustably or if desired rigidly connected in which case the lateral adjustment between the looped elements of the buffer front simultaneously adjusts the distance between the attaching members. These overlapping connecting portions may be adjustably secured together and rigidly clamped in vertically aligned cooperating position by any suitable form of clamping devices such as the clips 31, 32, 33 and 34 of construction similar to what has been described and which may be of the form illustrated in greater detail in Fig. 3. It is sometimes desirable to have the clamping devices somewhat out of line on the forward and rear members of the duplex buffer front as indicated in Fig. 2 so as to prevent undesirable contact between these clamping devices when the members are forced together under collision conditions. These spring steel or other resilient strips may advantageously have considerably greater vertical width than thickness, as indicated in Fig. 3, in which, however, the thickness is somewhat exaggerated for greater clearness, so that the buffer elements have a much greater degree of vertical stiffness as compared to their resilient yielding in horizontal directions under collision conditions. This form of construction also has the advantage that the buffer front may be shipped and sold in more compact condition when the loop elements are taken apart and separated from the attaching members and of course one of the loop members may be made sufficiently wider than the other, if desired, or otherwise packed, so that they can be nested together in such crated shipping condition.

Fig. 4 shows still another illustrative form of duplex buffer front in which the overlapping reenforced portion constitutes the auxiliary rear member of the buffer front which may, if desired, be formed of a single strip of tempered spring steel or other suitable resilient material. The initial impact forward member 38 may have as in the other cases the end loops 37, 39 which may extend backward slightly and the ends of this strip may be brought together into overlapping reenforcing position to form the overlapping portions 35, 42 throughout the central part of the auxiliary rear member and also throughout the straight connecting portions 41, 42 and 40, 45 if desired on either side of the buffer. A neat and strong appearance is thus given to the buffer especially when the ends 36, 44 of this front strip are arranged substantially even with the ends of the attaching members 14, 16 which may be adjustably or otherwise clamped or connected thereto as by the clamping devices, such as 17, 18 of the type previously described, for instance. With this construction a more resilient and readily yielding initial impact forward member is provided which under collision conditions engages the auxiliary rear member of the buffer front after it has been forced backward a number of inches and then the full strength of all of the resilient strips comes into play to resiliently resist and absorb the collision impact in the general manner above indicated. All of these types of construction may of course have the attaching members so clamped or connected to the other parts as to fit automobile frames of any usual or standard widths which is highly desirable from the commercial standpoint. Also as indicated the cooperating connecting portions of the attaching members and buffer front may be substantially straight so that this width adjustment of the attaching members may maintain them in substantially parallel position under all ordinary conditions.

This invention has been described in connection with a number of illustrative forms, proportions, parts, arrangements, materials, methods of connection and use, to the details of which disclosure the invention is not of course to be limited, since what is claimed as new and what is desired to be secured by Letters Patent is set forth in the appended claims.

1. The automobile buffer comprising a duplex buffer front formed of resilient spring steel strip and having end loops and an initial impact forward member and an auxiliary rear member spaced apart adjacent the central part of the buffer, the ends of said spring steel strip being clamped together in overlapping position outside of the central portion of said forward member to form a double strength reenforced portion thereof, said buffer front being formed with substantially straight connecting portions adjacent the end loops and cooperating spring strip attaching members formed with connecting portions adjustably clamped to the connecting portions of said buffer front and adapted to support the same from the frame members of an automobile.

2. The automobile buffer comprising a duplex buffer front formed of resilient spring steel strip and having end loops and an initial impact forward member and an auxiliary rear member spaced apart adjacent the central part of the buffer, the ends of said spring steel strip being clamped together in overlapping position to form a double strength reenforced portion, said buffer front being formed with substantially straight connecting portions adjacent the end loops and cooperating spring strip attaching members formed with connecting portions clamped to the connecting portions of said buffer front and adapted to support the same from the frame members of an automobile.

3. The automobile buffer comprising a duplex buffer front formed of resilient spring steel strip and having end loops and an initial impact forward member and an auxiliary rear member spaced apart adjacent the central part of the buffer, the ends of said spring steel strip being connected in overlapping position to form a double strength reenforced portion, said buffer front being formed with connecting portions and cooperating attaching members formed with connecting portions connected to the connecting portions of said buffer front and adapted to support the same from the frame members of an automobile.

4. The automobile buffer comprising a duplex buffer front comprising resilient spring steel strip and having end loops and a spaced apart initial impact forward member and auxiliary rear member adjacent the central part of the buffer, the ends of such spring steel strip being clamped together in overlapping position to reenforce the central part of the buffer front, said buffer front being formed with substantially straight connecting portions adjacent the end loops and cooperating attaching members formed with connecting portions adapted to be adjustably clamped to the connecting portions of said buffer front to support the same from the frame members of an automobile.

5. The automobile buffer comprising a duplex buffer front comprising resilient strip and having end loops and a spaced apart initial impact forward member and auxiliary rear member adjacent the central part of the buffer, the ends of such spring steel strip being secured together in overlapping position to reenforce the central part of the buffer front, said buffer front being formed with connecting portions and cooperating attaching members formed with connecting portions adapted to be adjustably clamped to the connecting portions of said buffer front to support the same from the frame members of an automobile.

6. The automobile buffer comprising a duplex buffer front comprising resilient strip and having end loops and a spaced apart initial impact forward member and auxiliary rear member adjacent the central part of the buffer, the ends of such spring steel strip being secured to reenforce the central part of the buffer front, and cooperating attaching members to support the same from the frame members of an automobile.

7. The automobile buffer comprising a duplex buffer front formed of resilient spring steel strip and having end loops and a double thickness reenforced initial impact forward member and an auxiliary rear member spaced apart at least adjacent the central part of the buffer, said buffer front being formed with connecting portions and cooperating spring strip attaching members formed and adapted to be adjustably clamped to the connecting portions of said buffer front to support the same from the frame members of an automobile.

8. The automobile buffer comprising a duplex buffer front formed of resilient spring steel strip and having end loops and a double thickness reenforced initial impact forward member and an auxiliary rear member spaced apart at least adjacent the central part of the buffer, said buffer front being formed with connecting portions and cooperating attaching members to support the same from the frame members of an automobile.

9. The automobile buffer comprising a duplex buffer front formed of resilient strip and having end loops and an initial impact forward member and an auxiliary rear member rearwardly bent adjacent its center to give additional spacing away from said forward member adjacent the central part of the buffer, the ends of said spring steel strip overlapping adjacent the central portion of one of said members to reenforce the same and cooperating spring strip attaching members formed with connecting portions adapted to be adjustably secured to the connecting portions of said buffer front and adapted to support the same from the frame members of an automobile.

10. The automobile buffer comprising a duplex buffer front formed of resilient strip and having end loops and an initial impact forward member and an auxiliary rear member rearwardly bent adjacent its center to give additional spacing away from said forward member adjacent the central part of the buffer, said spring steel strip overlapping adjacent the central portion of one of said members to reenforce the same, and cooperating spring strip attaching members to support the same from the frame members of an automobile.

11. The automobile buffer comprising a duplex buffer front formed of resilient spring steel strip and having end loops and front connecting means forming a double thickness reenforced initial impact forward member and an auxiliary rearwardly bent rear member spaced apart at least adjacent the central part of the buffer, said buffer front being formed with connecting portions and cooperating spring strip attaching members formed and adapted to be adjustably clamped to the connecting portions of said buffer front to support the same from the frame members of an automobile.

12. The automobile buffer comprising a duplex buffer front formed of resilient steel strip and having end loops and front connecting means forming a double thickness reenforced initial impact forward member and an auxiliary rear member spaced apart at least adjacent the central part of the buffer, said buffer front being formed with connecting portions and cooperating attaching members to support the same from the frame members of an automobile.

13. The automobile buffer comprising a duplex buffer front formed of steel strip and having end loops adapted to extend into position adjacent the wheels and an auxiliary rear impact member spaced apart at least adjacent the central part of the buffer, the central portion of one of said impact members being of multiple strip stiffened construction, said buffer front being formed with connecting portions and cooperating steel strip attaching members formed and adapted to be adjustably clamped to the connecting portions of said buffer front to support the same from the frame members of an automobile.

14. The automobile buffer comprising a duplex buffer front formed of resilient steel strip and having end loops adapted to extend into protective position adjacent the wheels and connecting means forming an initial impact forward member and an auxiliary rear impact member spaced apart at least adjacent the central part of the buffer, said buffer front being formed with connecting portions and cooperating steel strip attaching members to support the same from the frame members of an automobile.

15. The automobile buffer comprising a duplex buffer front formed of resilient steel strip and having end loops adapted to extend into protective position adjacent the wheels and connecting means forming an initial impact forward member and an auxiliary rear impact member spaced apart at least adjacent the central part of the buffer, one of said impact members being of double thickness reenforced construction, said buffer front being formed with connecting portions and cooperating attaching members to support the same from the frame members of an automobile.

16. The automobile buffer comprising a duplex buffer front formed of steel strip and having end loops adapted to extend into position adjacent the wheels and an auxiliary rear impact member, the central portion of one of said impact members being of multiple strip stiffened construction, said buffer front being formed with connecting portions and cooperating steel strip attaching members formed and adapted to be adjustably clamped to the connecting portions of said buffer front to support the same from the frame members of an automobile.

17. The automobile buffer comprising a buffer front formed of resilient steel strip and having end loops adapted to extend into protective position adjacent the wheels and connecting means forming an initial impact forward member and an auxiliary rear impact member, said initial impact member being of double strip reenforced construction, said buffer front being formed with connecting portions and cooperating attaching members to support the same from the frame members of an automobile.

GEORGE ALBERT LYON.